(12) United States Patent
Leedham et al.

(10) Patent No.: US 6,925,205 B2
(45) Date of Patent: Aug. 2, 2005

(54) METHODS, SYSTEMS AND COMPUTER PROGRAM PRODUCTS FOR COLOR MATCHING

(75) Inventors: David Leedham, Hebden Bridge (GB); Derek Priestley, Brighouse (GB); Malcolm Gill, Halifax (GB); Stephen Martin Burkinshaw, Wetherby (GB); Brian Nattress, Leeds (GB)

(73) Assignee: Digital Colour Measurement Limited, Leeds (GB)

( * ) Notice: Subject to any disclaimer, the term of this patent is extended or adjusted under 35 U.S.C. 154(b) by 528 days.

(21) Appl. No.: 09/909,552

(22) Filed: Jul. 20, 2001

(65) Prior Publication Data

US 2002/0048400 A1 Apr. 25, 2002

Related U.S. Application Data

(60) Provisional application No. 60/288,592, filed on May 3, 2001, and provisional application No. 60/255,461, filed on Dec. 13, 2000.

(30) Foreign Application Priority Data

| Aug. 7, 2000 | (GB) | 0019297 |
| Nov. 3, 2000 | (GB) | 0027021 |
| Feb. 13, 2001 | (GB) | 0103453 |
| Apr. 26, 2001 | (GB) | 0110197 |
| Jun. 6, 2001 | (GB) | 0113743 |

(51) Int. Cl.[7] .............................................. G06K 9/00
(52) U.S. Cl. .................... 382/167; 382/162; 433/203.1
(58) Field of Search ................................ 382/128, 162, 382/167, 168; 348/65, 66; 433/26, 29, 199.1, 203.1

(56) References Cited

U.S. PATENT DOCUMENTS

| 4,654,794 A | * | 3/1987 | O'Brien | 433/215 |
| 4,813,000 A | | 3/1989 | Wyman et al. | |
| 5,177,694 A | * | 1/1993 | Graham et al. | 382/165 |
| 6,011,540 A | * | 1/2000 | Berlin et al. | 345/601 |
| 6,512,999 B1 | * | 1/2003 | Dimas et al. | 703/9 |
| 6,560,356 B1 | * | 5/2003 | Takahashi et al. | 382/162 |
| 6,661,906 B1 | * | 12/2003 | Kawade et al. | 382/118 |

FOREIGN PATENT DOCUMENTS

| EP | 0 751 677 A2 | 1/1997 |
| JP | 50 103336 | 8/1975 |
| WO | WO 93/20648 | 10/1993 |

OTHER PUBLICATIONS

International Search Report fro PCT/GB 01/03505 dated Nov. 21, 2001.

* cited by examiner

Primary Examiner—Bhavesh M. Mehta
Assistant Examiner—Yubin Hung
(74) Attorney, Agent, or Firm—Myers Bigel Sibley & Sajovec

(57) ABSTRACT

A method and system of image processing on a computer, and a computer program product adapted for image processing, wherein a digital image of an article is imported into a computer, the digital image is color-corrected, an internal palette is generated from a database of predetermined color attributes and applied to the color-corrected digital image so as to generate a second digital image, and wherein a third digital image corresponding to the second digital image is generated, but replacing the predetermined color attributes with vivid color attributes. The present invention is of particular utility in the manufacture of dental prostheses from ceramics materials which substantially match a person's natural tooth colors.

21 Claims, 6 Drawing Sheets from Fig. 5A (A)

| Once all pixels in the extraction have been processed, build an external table in an SQL compliant database of the same structure as the internal array and populate it with the contents of the internal array |

↓

| Using stored SQL procedures in the database determine the dominant (most frequently occuring) original pixel value in each range key and create an internal array (key array) |

↓

| For each element in the key array draw a vivid colour rectangle as a key underneath the contour image and identify it with the shade relevant to that key colour |

Fig. 5B

METHODS, SYSTEMS AND COMPUTER PROGRAM PRODUCTS FOR COLOR MATCHING

RELATED APPLICATIONS

This application claims priority from the following UK Applications: GB 0019297.1, filed 7 Aug. 2000 GB 002702.5, filed 3 Nov. 2000; GB 0103453.7, filed 13 Feb. 2001; GB 0110197.1, filed 26 Apr. 2001; and GB 0113743.9, filed 6 Jun. 2001. This application also claims priority from U.S. Provisional Application No. 60/255,461, filed 13 Dec. 2000, and from U.S. Provisional Application No. 60/288,592, filed 3 May 2001. These disclosures are hereby incorporated by reference herein in their entirety.

FIELD OF THE INVENTION

The present invention relates to a method and system for image processing, for particular, but not exclusive, use in the colour matching of articles such as dental prostheses, textiles, paints, dyes, car body repairs, picture restoration and in the cosmetics industry. In addition, the present invention may be used in the colour identification of the colours of precious metals, gems and stones and for use in the printing and security industries.

BACKGROUND OF THE INVENTION

It is known from the prior art to colour match a variety of objects simply by eye and to compare the colour with a reference colour guide. The colour guide is usually held in proximity to the test object for a direct comparison. This is a purely subjective evaluation and can lead to a colour mismatch since one person's assessment may differ from another's. Moreover, the perception of colour is dependent on a number of factors such as the background lighting conditions and texture of the object itself. An object with a pitted surface may, if viewed in one direction, cast shadows on its own surface thus distorting the overall colour of the object. Alternatively, a smooth shiny object can reflect light from its surface leading to bright spots similar colour distortions.

In the restoration or replacement of a tooth or set of teeth, it is important accurately to select the correct tooth colour so as to match, not only the adjacent tooth in colour and shape, but to match the entire set of teeth in overall colour harmony and surface contour profile. However, it is difficult to critically assess highly reflective surfaces such as the enamel of teeth. It is known from the prior art to quantify the colour of teeth by manually comparing a patient's natural teeth with a set of "shade guides". These guides typically comprise a row of substantially flat, plastic tooth shaped items mounted on a board in ascending grades of shades. The first step in the colour determination process is made subjectively by the dentist or dental technician, by holding the shade guide next to the patient's own natural teeth and attempting to find the best match. This can be problematic because tooth colour is affected not only by ambient light colour/intensity in the surgery i.e. fluorescent or natural light, but also by the surrounding colour of the patient's own clothing or make-up/complexion. In addition this step is dependent on the visual acuity and experience of the dentist or dental technician.

Once the dentist or dental technician has made his/her choice of best match colour from the shade guide the next step in the process is to relay the information to a dental laboratory technician who then constructs the dental prosthesis, typically from a set of pre-coloured components. The information he/she may receive is that the dental prosthesis required is a mix between two or more of the shades on the guide. In this step of the overall process, there is a dependency on a yet further subjective colour assessment by the dental laboratory technician when mixing appropriate ratios of the pre-coloured components to the specified recipe. Once constructed, the finished product is then returned to the dentist for fitting into a patient's mouth. It is only after the dental prosthesis has been constructed that it becomes apparent if the colour match was accurately evaluated by the dentist or dental technician and subsequently constructed by the dental laboratory technician. It will be appreciated this process often results in unacceptable levels of colour mismatching so that a second or replacement dental prosthesis needs to be constructed at a substantial cost and inconvenience to the patient, dental professional and dental prosthesis manufacturer.

Methods which have been attempted to try to minimise human error when assessing tooth colour include:

illuminating the patient's mouth in a controlled manner and comparing the natural teeth to a reference shade guide set illuminated under similar conditions. The problem with this method is that it does not completely eliminate variations in ambient lighting conditions.

photographing the patient's mouth with a reference shade guide in the frame. The problem with this method is that the equipment can be bulky and that the colour in the photograph may be distorted and/or misrepresented through the process of developing and producing the photograph. In addition, the flash from the camera causes high levels of reflection from the tooth surface.

videoing the patient's mouth with a reference shade guide in the frame. The problem with this method is that the equipment can be bulky and that the colour in the video may not be accurate.

manually drawing and painting/colouring an artist's impression of a tooth. The problem with this is that it can be expensive, time consuming, and it is not independent of ambient lighting conditions.

None of the prior art methods is capable of capturing an exact colour image of a natural tooth. This is partly because of the inherent properties of teeth themselves. Natural teeth are curved, not uniformly smooth and the colour distribution of the tooth is not even or uniformly distributed throughout the tooth. Natural teeth are translucent on their surface, the transparencies of dentine and enamel are difficult to correct for when representing the colour of a tooth. Teeth are light reflective which results in bright spots and bright lines. All of these factors contribute to the difficulty in accurately capturing a colour image of a tooth.

A problem not addressed by any of the prior art methods is the subjective colour assessment which the dental laboratory technician has to make when given a recipe or image to work to, so as to construct the dental prosthesis. Some methods have made improvements in the standardisation of assessing the colour of the patient's tooth in the first instance, but problems remain with human errors in constructing and colour matching the prosthesis to a recipe.

A method of accurate colour image capture and construction of a prosthesis to that colour would offer immediate advantage over the prior art.

SUMMARY OF THE INVENTION (i) According to a first aspect of the invention there is provided a method of image processing on a computer, comprising the steps of:
(ii) importing a digital image of an article, the image further including a representation of a reference object having a predetermined colour;

(iii) colour-correcting the digital image on the basis of the reference object so as to generate a true-colour digital image;
(iv) selecting at least a portion of the true-colour digital image containing a representation of the article;
(v) determining true-colour attributes of pixels within the selected portion of the true-colour digital image;
(vi) generating a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and
(vii) generating a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes.

According to a second aspect of the present invention there is provided an image processing system, the system comprising a computer and:
(i) means for importing a digital image of an article, the image further including a representation of a reference object having a predetermined colour;
(ii) means for colour-correcting the digital image on the basis of the reference object so as to generate a true-colour digital image;
(iii) means for selecting at least a portion of the true-colour digital image containing a representation of the article;
(iv) means for determining true-colour attributes of pixels within the selected portion of the true-colour digital image;
(v) means for generating a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and
(vi) means for generating a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes.

According to a third aspect of the present invention, there is provided a computer program product for processing an image, the computer program product being operable, when installed on a computer, to:
(i) import a digital image of an article, the image further including a representation of a reference object having a predetermined colour;
(ii) colour-correct the digital image on the basis of the reference object so as to generate a true-colour digital image;
(iii) select at least a portion of the true-colour digital image containing a representation of the article;
(iv) determine true-colour attributes of pixels within the selected portion of the true-colour digital image;
(v) generate a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and
(vi) generate a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes.

The computer program product of the third aspect of the present invention may be a computer program in any suitable format, including object code, source code or a data storage medium on which the computer program is stored.

Preferably, the second and third digital images are displayed together on a monitor device or colour printout. Advantageously, there is also displayed a key comprising the false-colour attributes and their corresponding predetermined colour attributes, optionally including identification data relating to the predetermined colour attributes, RGB component values for the predetermined colour attributes, and/or data relating to a percentage composition of pixels sharing the same predetermined colour attributes within the second image.

Preferably, the digital image of the article is captured directly with a digital camera, the camera advantageously being provided with cross-polarised filtration. Typically this is achieved by a pair of cross-polarised filters, preferably the filters are grey so as provide a minimal colour temperature shift whilst simultaneously providing good transmission. The effect of cross-polarised photography is to control reflections, lustre and to cut out glare.

Preferably, the camera is pre-set and/or pre-programmed to a specified focal length. For example, the focal length may be 25±2 cm. It is desirable to try to reduce any deviations in focal length so as to minimise errors that may occur by virtue of variations in, or non-uniform, illumination.

The reference object referred to in step (i) above generally comprises a reference colour indicator placed in close proximity to the article or associated with the camera's visual field so that the captured image contains a reference colour.

Preferably, the reference colour is grey and more preferably still the grey is cool grey C pantone number 8. The reference indicator may take the form of a substantially U or L shaped block. The reference indicator may also be labelled so that the image of the object can easily be identified or cross referenced.

The reference object of known colour allows the digital image to be colour-corrected in a known manner in step (ii) above so as to generate the true-colour digital image.

In step (iii), a portion of the true-colour digital image is selected in a known manner, the selection comprising, for example, an image of a single tooth.

True-colour attributes of each pixel in the selection may be determined in step (iv) in a known manner by, for example, scanning through the true-colour digital image in a raster manner.

The database of predetermined colour attributes will generally contain fewer discrete attributes than are present within the true-colour digital image. In a particularly preferred application of the present invention, which is to generate dental prostheses from ceramics or the like of known colours so as closely to match a patient's natural tooth colours, the database will contain the colour attributes of a range of available ceramics materials or the like. The database may contain several subsets of ceramics colours corresponding to the ranges of colours offered by different ceramics manufacturers. At present, most manufacturers of ceramics for use in dental prostheses offer one or more discrete ranges of about sixteen subtly different shades. Hitherto, dental prostheses have been made using a single shade or colour of ceramic which has been subjectively judged to be the closest match to a patient's existing tooth or teeth. However, by way of the present invention, it is possible to determine shade variations within a single tooth and to replicate these shade variations in a prosthesis by selecting the closest match from the predetermined range of ceramics colours for individual areas of the tooth, and then to construct a prosthesis by painting or otherwise applying different shades of ceramics to a base prosthesis so as broadly to match the colour variations in the natural tooth. This is a significant advantage over the prior art.

The predetermined algorithm used to select the predetermined colour attributes for each pixel in the second digital image from the database, based on the true-colour attributes of each corresponding pixel in the true-colour digital image, may be any appropriate algorithm which will be known to a person of ordinary skill in the art. A currently preferred algorithm uses octree quantisation, but other standard techniques may also be used. It will be appreciated that the predetermined algorithm is in effect an image compression algorithm which creates an internal palette from the predetermined colour attributes in the database and then applies these to the second digital image so as to match, as closely as possible, the true-colour attributes in the true-colour digital image. For example, where the true-colour digital image contains a range of 256 colour attributes, the predetermined algorithm is used to compress these to the 16 colour attributes forming the internal palette made up of the available colours of the predetermined range of ceramics colours within a subset of the database, for each pixel selecting a ceramics colour attribute from the database closest to the true-colour attribute of the corresponding pixel in the true-colour digital image.

In step (vi) above, the third digital image may be generated by determining a range key value for each pixel in the second digital image and then representing this range key value at corresponding pixels in the third digital image with mutually distinguishable colour attributes on a pixel-by-pixel basis. In a preferred embodiment, the range key value for each pixel in the second digital image is determined by dividing the red component value by 16 and determining the integer part thereof, the green component value by 16 and determining the integer part thereof, and the blue component value by 16 and determining the integer part thereof. The range key values in this embodiment will therefore be 0 for component values 0 to 15, 1 for component values of 16 to 31, 2 for component values of 32 to 47, 3 for component values of 48 to 63 and so forth. Each range key value is then assigned a mutually distinguishable colour, preferably a vivid colour, in a manner known in the art, and a false-colour third digital image is then generated accordingly. The third digital image thus gives a clear indication as to which regions of the article, say a tooth, are to be represented by a particular colour selected from the palette available from the database. In other words, the degree of colour quantisation in the third digital image is the same as in the second digital image, but with the subtle colour differences between the colours from the palette of available ceramics colours being emphasised by using false colours. The third digital image, or contour image, may then be used as a guide by, say, a dental laboratory technician to assist in manufacturing a dental prosthesis by selecting the ceramic shades corresponding to the false-colour representations and then painting these onto a base prosthesis in accordance with the contour map of the third digital image.

In order to assist the dental technician, it is preferred that the method of the present invention is arranged to generate a display, for example on a computer display or a colour printout, showing both the second and the third digital images, together with a key showing the various ceramics colours from the database and their associated false colours in the third digital image. They key may comprise first and second rows of coloured rectangles, the first row showing the available ceramics colours and the second row showing the corresponding false colours in juxtaposition thereto. The key may optionally include identification data relating to the predetermined ceramics colours, RGB component values for the predetermined ceramics colours, and/or data relating to a percentage composition of pixels sharing the same predetermined ceramics colours within the second image.

The key may be generated by building an internal array containing data relating to each pixel in the second digital image. For each pixel, the internal array may contain data fields giving the original pixel colour, the red component, the green component, the blue component, the range key value and a count of pixels having that range key value. For any particular pixel, if its range key value does not yet exist as the internal array is being built, then a new element is created in the array. If, however, the range key value does already exist, then the count of pixels having that range key value is increased by one. Once the internal array has been built, an external table is constructed in an SQL compliant database having the same structure as the internal array, and the external table is then populated with the contents of the internal array. Stored SQL procedures may then be used in a known manner to determine, in the SQL compliant database, the dominant (most frequently occurring) original pixel value in each range key and then to create a corresponding internal array (key array). Then, for each element in the key array, a vivid colour rectangle may be drawn as a key underneath the third digital image and identified with a shade relevant to that key colour.

In use, embodiments of the present invention allow a user to take a photograph of an article, for example a piece of coloured textile and to relay information relating to the photograph to a place remote from where the textile actually is, for example a paint factory. An operator in the paint factory then initiates a software program to analyse the colour values from which a recipe can be generated so that a replica of the colour of the textile can be reconstituted from various ratios of different dyes.

Preferably, embodiments of the invention are used for colour matching a natural tooth or set of teeth so that a dental prosthesis can be constructed to match the natural tooth or teeth of a patient.

Reference herein to a dental prosthesis is intended to include crowns, dentures, caps and any other dental product which is intended to replace or form part of a patient's set of teeth.

Embodiments of the present invention need not be limited to use in the manufacture of dental prostheses, but may be used for colour matching of textiles, paints, dyes, car body parts, pigments in picture restoration and cosmetics such as hair dyes or skin preparations, among other applications.

It will be appreciated that embodiments of the present invention may also be used to monitor colour deterioration over time of, for example, textiles or paintings by comparing colour values against each other over time. Additionally, embodiments of the present invention may be used to monitor colour standards during industrial processes such as car and/or textile manufacture.

For a better understanding of the present invention and to show how it may be carried into effect, reference shall now be made by way of example to the accompanying drawings, in which:

BRIEF DESCRIPTION OF THE INVENTION

FIGS. 5A and 5B are a flow chart setting out the steps involved in an embodiment of the present invention.

DETAILED DESCRIPTION OF THE INVENTION

Figure 1:
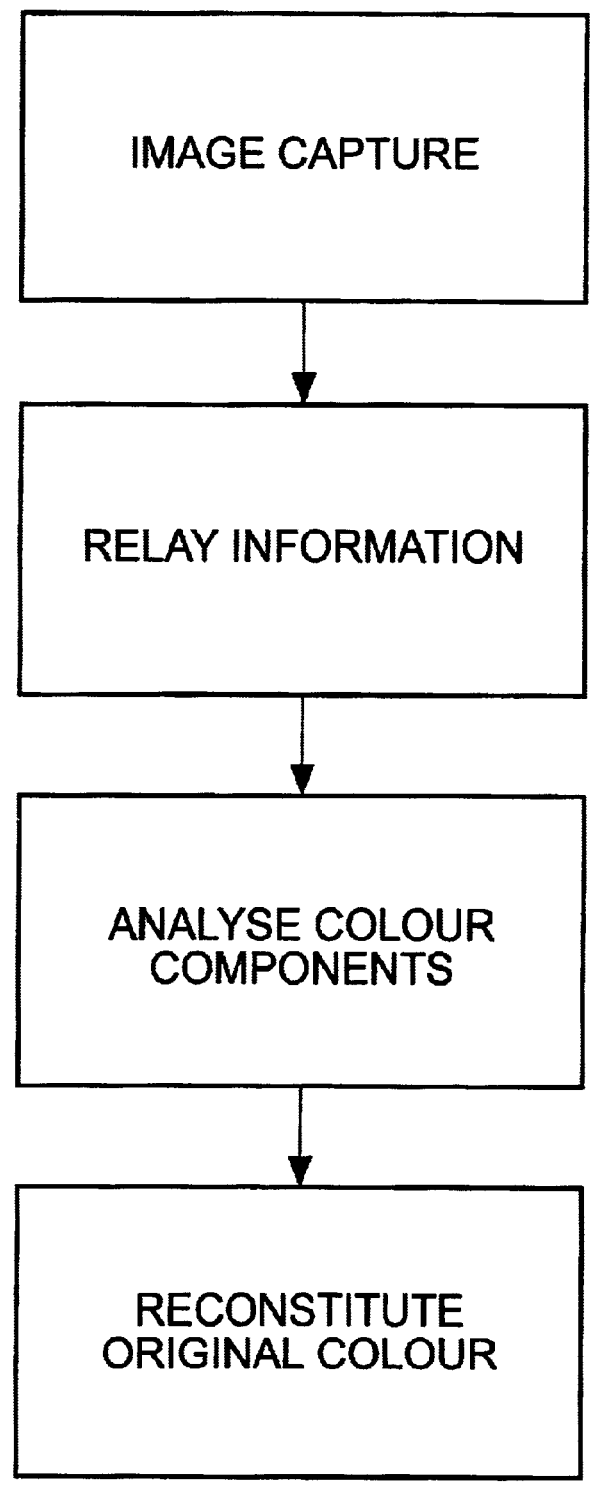
FIG. 1 shows a schematic flow diagram of a method of colour matching using an embodiment of the present invention.
Figure 4:
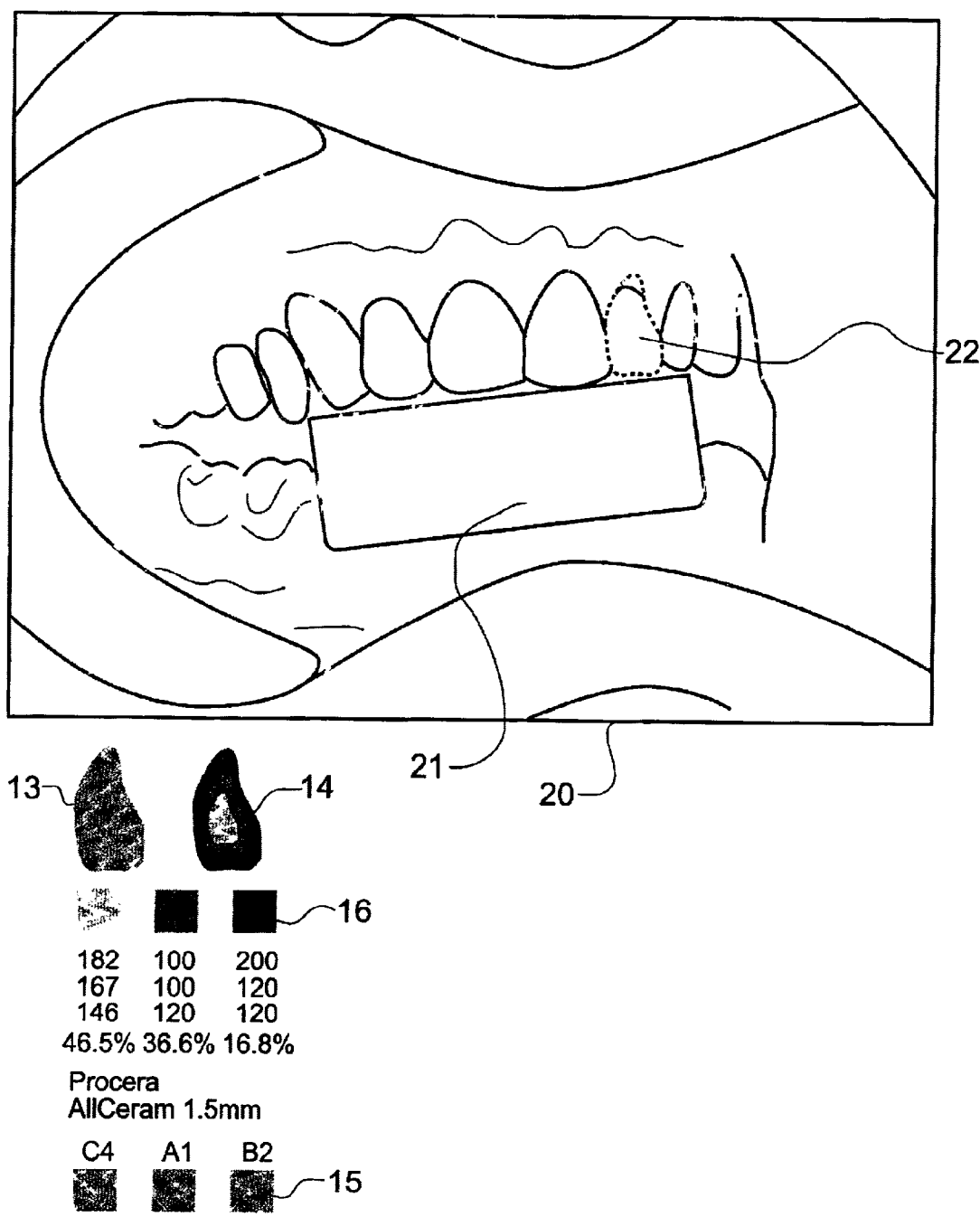
FIG. 4 shows a digital image including a colour reference indicator in situ in a patient's mouth.

With reference to FIG. 1 there is shown a flow diagram of the steps of a method of colour matching/identification of an object using an embodiment of the present invention. The first step of the method is to capture an image of an object which it is desired to colour match and/or colour identify. This is achieved by first illuminating the object with an appropriate light source and taking at least one photograph of it with a digital camera fitted with cross-polarised filtration. Optionally a colour reference indicator is included in the captured image (see FIG. 4). The camera can be pre-programmed to a specified focal length and arranged to be a selected distance away from the object in order to reduce variations in illumination conditions. The object could be a piece of textile, wall covering, part of a picture which needs to be restored or requires the original colour recorded for posterity, a car body part or a human face for which a suitable cosmetic/hair dye hue can be matched, area of a human body, specimen of currency, photograph, precious metal or gem or any other article which needs to be colour matched/identified.

Once the at least one photograph has been taken, information relating to the colour image can be relayed by an electronic communication system or on a data carrier to a site remote from where the at least one photograph was taken. When this information is received at the appropriate site, an operator initiates the computer program product of an embodiment of the present invention which is capable of interpreting the received data and analysing the colour values of the original image, optionally with respect to the colour reference indicator. Typically the colour values are assigned individual bright colour keys and the analysis proceeds to determine the average and most dominant colour value in each area. The colour values are represented by the intensities of the red, green and blue components of that value. Intensity of red, blue and green is selected as these colours are the primary colours of light. Each image is analysed so that the intensity and relative ratio of each colour is calculated. From the image, colour intensity values are generated so that a replica of the colour of the original coloured object can be produced. The computer program is also capable of converting the values of the red, green and blue intensities into parameters that the operator can reconstitute into colour, for example dye numbers, cosmetic colour values and so on.

The operator can then view the reconstituted image next to the data received for a direct comparison. Alternatively, the operator can transmit the information relating to the reconstituted image to the location of original object so that a comparison can be made between the object itself and the reconstituted image. This step allows for quality control. In the instance of providing a colour reference indicator, the whole image displayed on a VDU/monitor/screen can be colour corrected/calibrated.

It will be appreciated that this provides advantages over the prior art by reducing the level of subjective human assessment of colour matching/identification. Moreover, embodiments of the present invention can be applied to many diverse industries and can be used to monitor colour quality control in the paint, dye, car and textile industries. It is envisaged that one particular use that will offer improvement over current practices is in colour matching original tooth/teeth colour to a dental prosthesis.

Figure 2:
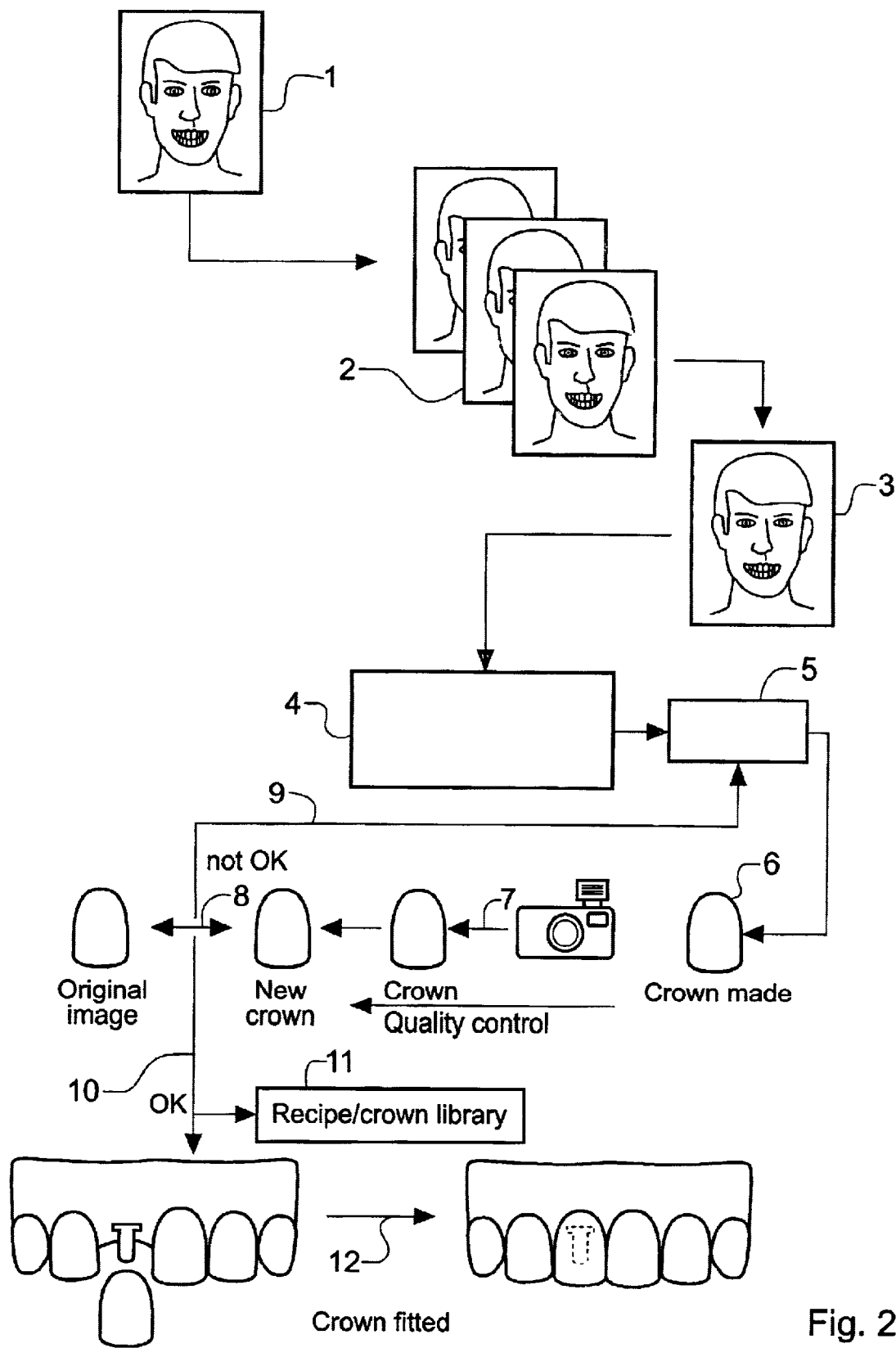
FIG. 2 shows a schematic flow diagram illustrating the use of an embodiment of the present invention.

With reference to FIG. 2 there is shown a schematic flow diagram of the use of an embodiment of the present invention for colour matching a dental crown. In this process, the first step is to illuminate the patient's mouth in a controlled manner with a known and reproducible light source. The dentist then takes a photograph of the patient's mouth with a digital camera fitted with cross-polarised filtration so as to produce an image (1). The dentist would typically set the camera a pre-determined distance away from the patient with respect to a skeletal reference point such as the bridge of the nose and/or nap of the patient's chin. In this way variations between photographs can be reduced.

Information relating to the colour of the patient's original tooth is downloaded from the digital camera and sent via an electronic communication system such as the Internet or on an electronic data carrier system such as a floppy disc or CD-ROM to the dental laboratory. Since this information is confidential, the information would typically be encrypted for transmission. Once received, the image data is decoded and processed by a computer program product of an embodiment of the present invention so that a series of red, blue and green intensities (2) corresponding to the primary colours of light are produced. The computer program then can calibrate the image with respect to a colour reference indicator into constituent colour values (2) and then into an image (3), and at the same time the program analyses the colour values into relative ratios and distribution patterns so as to generate a colour map. The map can then be converted into dental laboratory parameters such as porcelain or ceramics colours and so on (4), and the program thereafter provides a recipe (5) from which the dental laboratory technician is able to construct a prosthesis/crown (6).

An image (7) of the prosthesis/crown (6) is then subjected to quality control by comparing its colour to that of the original natural tooth (8). In the instance that there is a discrepancy in the match of colour between the new crown and the original tooth (9) the dental technician can amend the recipe (5) to compensate for the colour difference or alternatively request a further original photograph to work from. In this way, the colour of the crown can advantageously be checked before it is released to the dentist for fitting into a patient's mouth.

In the instance that the crown colour matches the original natural tooth (10), the recipe can be recorded in a central data bank (11) or crown recipe library for future reference. Subsequently, the colour matched crown can be released to the dentist for fitting (12) into the patient's mouth.

Figure 3:
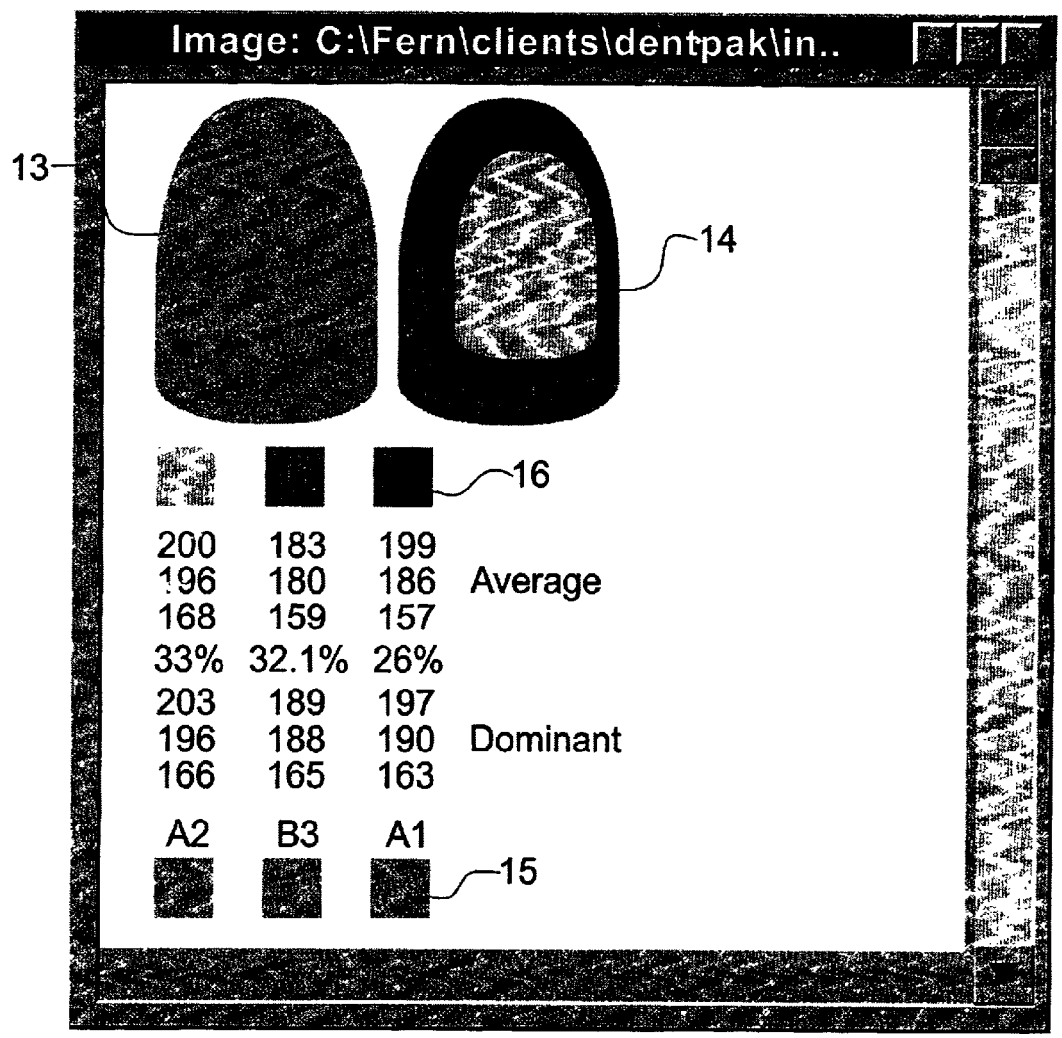
FIG. 3 shows a colour analysis of a tooth using an embodiment of the present invention.

With reference to FIG. 3 there is shown a computer display of a colour analysis of a tooth produced by an embodiment of the present invention. The tooth image (13) is divided into several areas of similar colour value, each of which is assigned a unique bright colour key thus making them more distinguishable to the eye as in image (14). The analysis proceeds to determine both the average and the most dominant colour value in each area. The colour values are represented by the intensities of red, green and blue components of that value so that a colour map of the tooth can be visualised. Specifically, image (13) is the second digital image which corresponds to the selected portion of the true-colour digital image of a tooth, but to which an internal palette (comprising the colour attributes selected from the database of predetermined colour attributes relating to the ceramics colours) has been applied by way of octree quantisation. Image (14) is the third digital image which corresponds to the second digital image (13) but with the predetermined colour attributes having been replaced by mutually-distinguishable false-colour attributes for ease of interpretation. Also displayed are a key (15) showing the ceramics colours selected from the database and which are to be used in making up a dental prosthesis to match the image (13), and a key (16) showing the corresponding false colours used in the image (14). Also displayed are at (17) the RGB components of the average original pixel values in each range key and at (18) the RGB components of the dominant (most frequently occurring) original pixel values in each range key, together with an indication at (19) of the percentage composition of each colour within the images (13) and (14). A dental technician may then use image (14) and the keys (15) and (16) to create a dental prosthesis by painting or otherwise applying ceramics materials of the colours shown in key (15) onto a base prosthesis (not shown), using image (14) as a clear contour guide, thus creating a prosthesis matching the image (13).

FIG. 5 shows a digital image (20) of a patient's mouth, obtained using a digital camera (not shown). A reference object (21) having a predetermined colour is included in the image (20) so as to enable colour correction of the image. Also shown is a selection (22) from the image (20) corresponding to a single tooth. This selection (22) is used as the basis for the second (13) and third (14) digital images, shown below image (20) in FIG. 5, together with the keys (15) and (16).

Figure 5A:
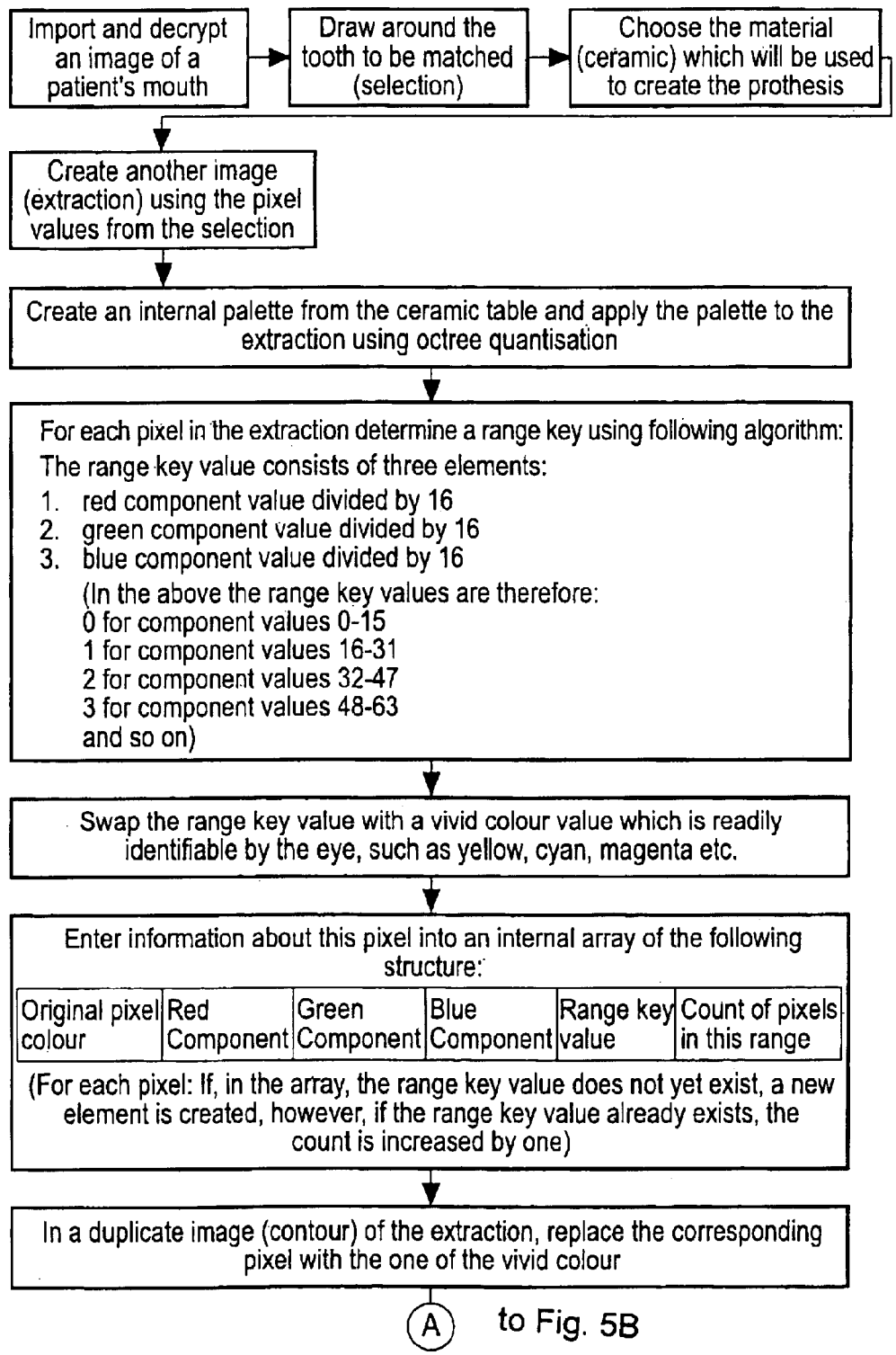

FIGS. 5A and 5B are a flow diagram illustrating an embodiment of the present invention as described hereinbefore.

Embodiments of the present invention provide improvements over the prior art by reducing the problems associated with construction of a dental prosthesis and help to avoid the situation where it is found that there is a colour mismatch only when the prosthesis is constructed and returned to the dentist. Embodiments of the present method allow for quality control before release of the prosthesis to the dentist.

It will also be appreciated that embodiments of the present invention may be of use in diagnosing dermatological lesions and other such conditions where the physical appearance and colour of an organ is a relevant diagnostic factor. Embodiments of the present invention can be used for capturing images of a part of a body and to relay this information to a health care professional remote from the patient so that a diagnosis can be made without the patient needing to be physically present.

What is claimed is:

1. A method of image processing on a computer, comprising the steps of:
    (i) importing a digital image of an article, the image further including a representation of a reference object having a predetermined colour;
    (ii) colour-correcting the digital image on the basis of the reference object so as to generate a true-colour digital image;
    (iii) selecting at least a portion of the true-colour digital image containing a representation of the article;
    (iv) determining true-colour attributes of pixels within the selected portion of the true-colour digital image;
    (v) generating a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and
    (vi) generating a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes;
    wherein the article is a tooth, the database is a database of ceramics colours or the like used for manufacturing dental prostheses, and the third digital image is a template for manufacturing a dental prosthesis.

2. A method according to claim 1, wherein the database of predetermined colour attributes contains fewer discrete colour attributes than are present in the true-colour digital image.

3. A method according to claim 1, wherein the predetermined algorithm in step (v) is an octree quantisation algorithm.

4. A method according to claim 1, wherein the third digital image in step (vi) is generated by determining a range key value for each pixel in the second digital image and then representing this range key value at corresponding pixels in the third digital image with mutually distinguishable colour attributes on a pixel-by-pixel basis.

5. A method according to claim 4, wherein the range key value for each pixel in the second digital image is determined by dividing a red component value by 16 and determining an integer part thereof, dividing a green component value by 16 and determining an integer part thereof and dividing a blue component value by 16 and determining an integer part thereof.

6. A method according to any preceding to claim 1, wherein the second and third digital images are displayed together on a visual display unit.

7. A method according to any preceding to claim 1, wherein the second and third digital images are displayed together on a colour printout.

8. An image processing system, the system comprising a computer and:
    (i) means for importing a digital image of an article, the image further including a representation of a reference object having a predetermined colour;
    (ii) means for colour-correcting the digital image on the basis of the reference object so as to generate a true-colour digital image;

(iii) means for selecting at least a portion of the true-colour digital image containing a representation of the article;

(iv) means for determining true-colour attributes of pixels within the selected portion of the true-colour digital image;

(v) means for generating a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and (vi) means for generating a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes;

wherein the article is a tooth, the database is a database of ceramic colours or the like used for manufacturing dental prosthesis, and the third digital image is a template for manufacturing a dental prosthesis.

9. A system as claimed in claim 8, wherein the database of predetermined colour attributes contains fewer discrete colour attributes than are present in the true-colour digital image.

10. A system as claimed in claim 8, wherein the predetermined algorithm in step (v) is an octree quantisation algorithm.

11. A system as claimed in claim 8, wherein the third digital image in step (vi) is generated by determining a range key value for each pixel in the second digital image and then representing this range key value at corresponding pixels in the third digital image with mutually distinguishable colour attributes on a pixel-by-pixel basis.

12. A system as claimed in claim 11, wherein the range key value for each pixel in the second digital image is determined by dividing a red component value by 16 and determining an integer part thereof, dividing a green component value by 16 and determining an integer part thereof and dividing a blue component value by 16 and determining an integer part thereof.

13. A system as claimed in claim 8, wherein the second and third digital images are displayed together on a visual display unit.

14. A system as claimed in claim 8, wherein the second and third digital images are displayed together on a colour printout.

15. A computer program product for processing an image, the computer program product being operable, when installed on a computer, to:

(i) import a digital image of an article, the image further including a representation of a reference object having a predetermined colour;

(ii) colour-correct the digital image on the basis of the reference object so as to generate a true-colour digital image;

(iii) select at least a portion of the true-colour digital image containing a representation of the article;

(iv) determine true-colour attributes of pixels within the selected portion of the true-colour digital image;

(v) generate a second digital image corresponding to the selected portion of the true-colour digital image, but replacing true-colour attributes of each pixel with colour attributes selected from a database of predetermined colour attributes, for each pixel selecting predetermined colour attributes from the database closest to the true-colour attributes as determined by a predetermined algorithm; and (vi) generate a third digital image corresponding to the second digital image, but replacing the colour attributes selected from the database for each pixel with mutually distinguishable false-colour attributes so as to form a contour image clearly distinguishing respective sets of pixels sharing the same predetermined colour attributes;

wherein the article is a tooth, the database is a database of ceramic colours or the like used for manufacturing dental prosthesis, and the third digital image is a template for manufacturing a dental prosthesis.

16. A product as claimed in claim 15, wherein the database of predetermined colour attributes contains fewer discrete colour attributes than are present in the true-colour digital image.

17. A product as claimed in claim 15, wherein the predetermined algorithm in step (v) is an octree quantisation algorithm.

18. A product as claimed in claim 15, wherein the third digital image in step (vi) is generated by determining a range key value for each pixel in the second digital image and then representing this range key value at corresponding pixels in the third digital image with mutually distinguishable colour attributes on a pixel-by-pixel basis.

19. A product as claimed in claim 18, wherein the range key value for each pixel in the second digital image is determined by dividing a red component value by 16 and determining an integer part thereof, dividing a green component value by 16 and determining an integer part thereof and dividing a blue component value by 16 and determining an integer part thereof.

20. A product as claimed in claim 15, wherein the second and third digital images are displayed together on a visual display unit.

21. A product as claimed in claim 15, wherein the second and third digital images are displayed together on a colour printout.

* * * * *

UNITED STATES PATENT AND TRADEMARK OFFICE
CERTIFICATE OF CORRECTION

PATENT NO. : 6,925,205 B2
DATED : August 2, 2005
INVENTOR(S) : Leedham et al.

It is certified that error appears in the above-identified patent and that said Letters Patent is hereby corrected as shown below:

Column 10,
Line 54, should read -- 6. A method according to claim 1, --.
Line 57, should read -- 7. A method according to claim 1, --.

Signed and Sealed this

Twenty-fifth Day of April, 2006

JON W. DUDAS
*Director of the United States Patent and Trademark Office*